(12) United States Patent
Giulietti et al.

(10) Patent No.: US 11,179,888 B2
(45) Date of Patent: Nov. 23, 2021

(54) RECOATERS WITH GAS FLOW MANAGEMENT

(71) Applicant: Delavan Inc., West Des Moines, IA (US)

(72) Inventors: Diana Giulietti, Manchester, CT (US); David W. Morganson, East Hartford, CT (US)

(73) Assignee: Delavan Inc., West Des Moines, IA (US)

(*) Notice: Subject to any disclaimer, the term of this patent is extended or adjusted under 35 U.S.C. 154(b) by 295 days.

(21) Appl. No.: 16/258,111

(22) Filed: Jan. 25, 2019

(65) Prior Publication Data
US 2020/0238607 A1    Jul. 30, 2020

(51) Int. Cl.
| | | |
|---|---|---|
| *B29C 64/205* | (2017.01) | |
| *B29C 64/153* | (2017.01) | |
| *B29C 64/188* | (2017.01) | |
| *B05C 11/02* | (2006.01) | |
| *B22F 12/00* | (2021.01) | |
| *B29C 64/214* | (2017.01) | |
| *B22F 10/10* | (2021.01) | |

(52) U.S. Cl.
CPC .......... *B29C 64/205* (2017.08); *B05C 11/023* (2013.01); *B22F 12/00* (2021.01); *B29C 64/153* (2017.08); *B29C 64/188* (2017.08); *B29C 64/214* (2017.08); *B22F 10/10* (2021.01)

(58) Field of Classification Search
CPC ..... B29C 64/205; B29C 64/214; B22F 12/60; B22F 12/63
See application file for complete search history.

(56) References Cited

U.S. PATENT DOCUMENTS

| | | | |
|---|---|---|---|
| 7,048,530 B2 | 5/2006 | Gaillard et al. | |
| 8,967,990 B2 * | 3/2015 | Weidinger | B29C 64/153 425/174.4 |

(Continued)

FOREIGN PATENT DOCUMENTS

| | | |
|---|---|---|
| EP | 3162543 A1 | 5/2017 |
| EP | 3363566 A1 | 8/2018 |
| JP | H3243515 A | 10/1991 |

OTHER PUBLICATIONS

Extended European Search Report dated Mar. 6, 2020, issued during the prosecution of European Patent Application No. EP 19211190.4.

*Primary Examiner* — Timothy Kennedy
(74) *Attorney, Agent, or Firm* — Locke Lord LLP; Joshua L. Jones; Scott D. Wofsy

(57) ABSTRACT

An additive manufacturing device includes a recoater configured to push powder onto a build platform. The recoater defines an advancing direction for pushing powder. A first baffle is mounted to a first end of a leading edge of the recoater and a second baffle mounted to a second end of the leading edge of the recoater opposite the first end. Each of the first and second baffles includes a base mounted to the recoater, a first wall that extends obliquely ahead of and laterally outward from the base relative to the advancing direction, and a second wall opposite the first wall. The second wall extends obliquely ahead of and laterally inward from the base relative to the advancing direction. A volume is defined between the first and second wall with capacity to collect powder as the recoater advances.

10 Claims, 4 Drawing Sheets

(56) References Cited

U.S. PATENT DOCUMENTS

| | | |
|---|---|---|
| 9,718,086 B2 | 8/2017 | Giulietti et al. |
| 2015/0290671 A1 | 10/2015 | Jakimov et al. |
| 2016/0001401 A1 | 1/2016 | Dimter et al. |

* cited by examiner

RECOATERS WITH GAS FLOW MANAGEMENT

BACKGROUND

1. Technological Field

The present disclosure relates to additive manufacturing, and more particularly to powder bed fusion additive manufacturing machines.

2. Description of Related Art

Powder bed fusion additive manufacturing can benefit from flowing a laminar flow of inert gas over the build in progress, e.g. to help control material properties in metal being sintered in the build, to remove impurities and vaporized metal resulting from the melt process, and to keep laser optics clean. Traditional recoaters tend to push powder laid at each new layer of the build. As a recoater repeatedly plows powder from the build area, banks of powder can build up on either side of the recoater's path over the build area. If left unchecked, the banks can disrupt the laminar flow of inert gas so that it does not effectively bathe the build area, which can be detrimental to build quality and laser optics.

The conventional techniques have been considered satisfactory for their intended purpose. However, there is an ever present need for improved recoaters. This disclosure provides a solution for this need.

SUMMARY OF THE INVENTION

An additive manufacturing device includes a recoater configured to push powder onto a build platform. The recoater defines an advancing direction for pushing powder. A first baffle is mounted to a first end of a leading edge of the recoater and a second baffle mounted to a second end of the leading edge of the recoater opposite the first end. Each of the first and second baffles includes a base mounted to the recoater, a first wall that extends obliquely ahead of and laterally outward from the base relative to the advancing direction, and a second wall opposite the first wall. The second wall extends obliquely ahead of and laterally inward from the base relative to the advancing direction. A volume is defined between the first and second wall with capacity to collect powder as the recoater advances.

The first and second walls can each be angled 30°-60°, e.g., 45°, from the advancing direction of the recoater. The first wall of each of the first and second baffles can be longer than the second wall.

A build platform can be mounted stationary relative to advancing and returning movement of the recoater over the build platform. A gas inlet for inert gas can be included on a lateral side of the build platform. A gas outlet for inert gas can be included on a lateral side of the build platform opposite the inlet. A powder drain can be included at one end of the build platform. The capacity of each of the first and second baffles can be sufficient to collect and move powder in the advancing direction to the powder drain with each advance of the recoater to prevent buildup of lateral powder banks blocking flow of inert gas from the gas inlet to the gas outlet.

A third baffle can be mounted to a first end of a trailing edge of the recoater opposite the leading edge, and a fourth baffle can be mounted to a second end of the trailing edge of the recoater opposite the first end. Each of the third and fourth baffles can include a base mounted to the recoater, a first wall that extends obliquely ahead of and laterally outward from the base relative to a returning direction opposite the advancing direction, and a second wall opposite the first wall extending obliquely ahead of and laterally inward from the base relative to the returning direction. A volume can be defined between the first and second wall with capacity to collect powder as the recoater returns from advancing. The first and second walls of the third and fourth baffles can each be angled 45° from the returning direction of the recoater. The first wall of each of the third and fourth baffles can be longer than the second wall thereof. A second powder drain can be included at an end of the build platform opposite the first powder drain, wherein the capacity of each of the third and fourth baffles is sufficient to collect and move powder in the advancing direction to the second powder drain with each advance of the recoater to prevent buildup of lateral powder banks blocking flow of inert gas from the gas inlet to the gas outlet.

A method of additive manufacturing includes advancing a recoater over a build area to push powder across the build area. The method includes collecting powder in a baffle mounted to an end of the recoater, depositing the collected powder from the baffle beyond the build area, and selectively fusing powder in the build area.

Collecting powder can include collecting powder in the first baffle and in a second baffle mounted to an end of the recoater opposite the first baffle. The first and second baffles can be mounted to a leading edge of the recoater and the method can include returning the recoater over the build area to push powder across the build area, collecting powder in a third baffle mounted to an end of the recoater while returning the recoater over the build area, and depositing the collected powder from the third baffle beyond the build area. Collecting power in the third baffle can include collecting powder in a fourth baffle mounted to an end of the recoater opposite the third baffle. The method can include bathing the build area in a laminar flow of inert gas while selectively fusing the powder in the build area. The method can include repeating advancing the recoater, collecting powder, depositing the collected powder, selectively fusing powder, and bathing the build area in a laminar flow of inert gas without building up a bank of powder along the build area to block the laminar flow of inert gas.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
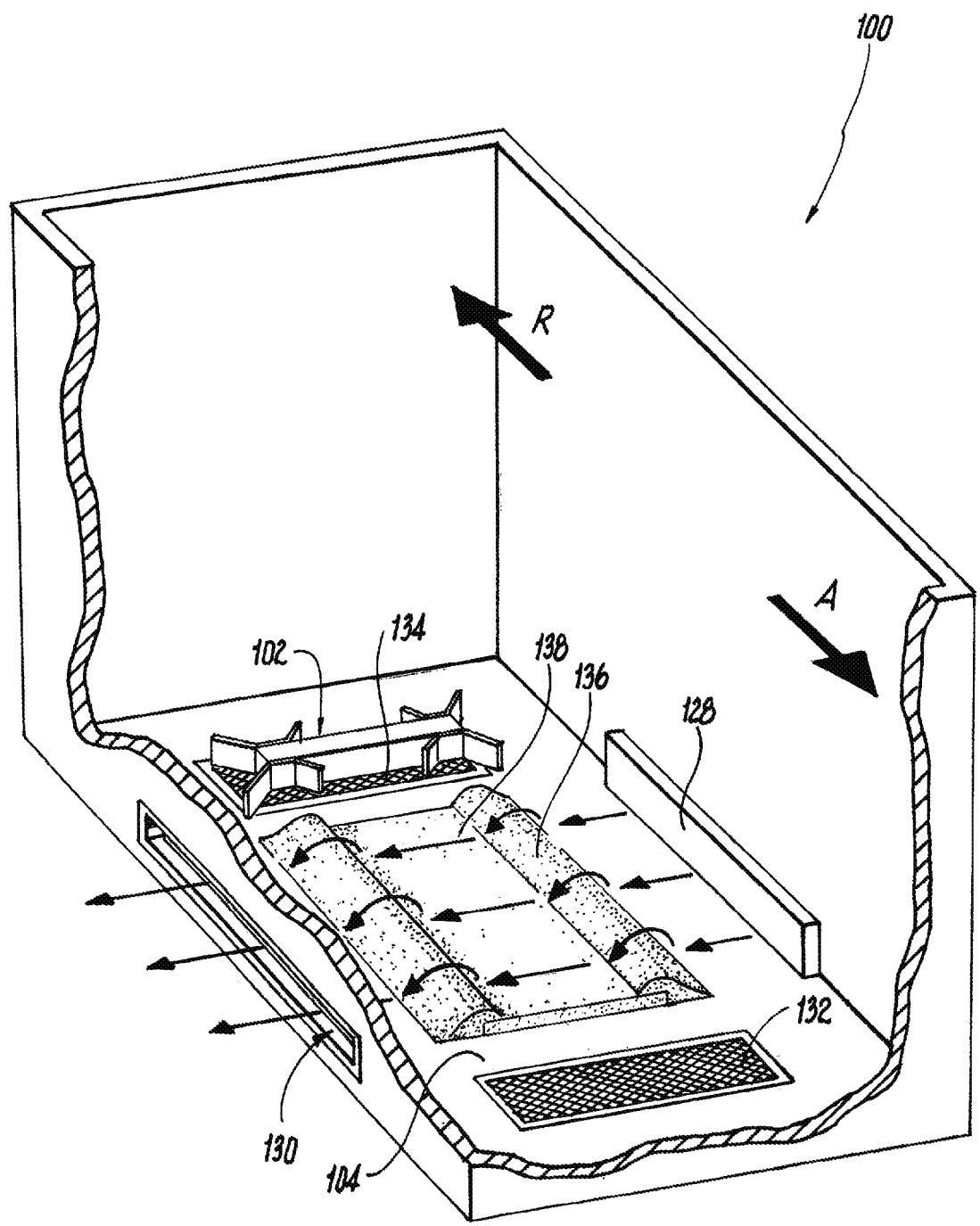
FIG. 1 is a schematic perspective view of an exemplary embodiment of a device constructed in accordance with the present disclosure, showing the recoater in a starting position.

Reference will now be made to the drawings wherein like reference numerals identify similar structural features or aspects of the subject disclosure. For purposes of explanation and illustration, and not limitation, a partial view of an exemplary embodiment of the an additive manufacturing device in accordance with the disclosure is shown in FIG. 1 and is designated generally by reference character 100. Other embodiments of additive manufacturing devices in accordance with the disclosure, or aspects thereof, are provided in FIGS. 2-4, as will be described. The systems and methods described herein can be used to prevent powder buildup banks lateral to the build area disrupting laminar flow of inert gas over the build area during sintering in additive manufacturing.

The additive manufacturing device 100 includes a recoater 102 configured to push powder onto a build area 138 of a build platform 104. The recoater 102 defines an advancing direction A for pushing the powder, and a returning direction R opposite the advancing direction A. Four baffle 106, 108, 110, 112 are mounted the recoater 102.

Figure 4:
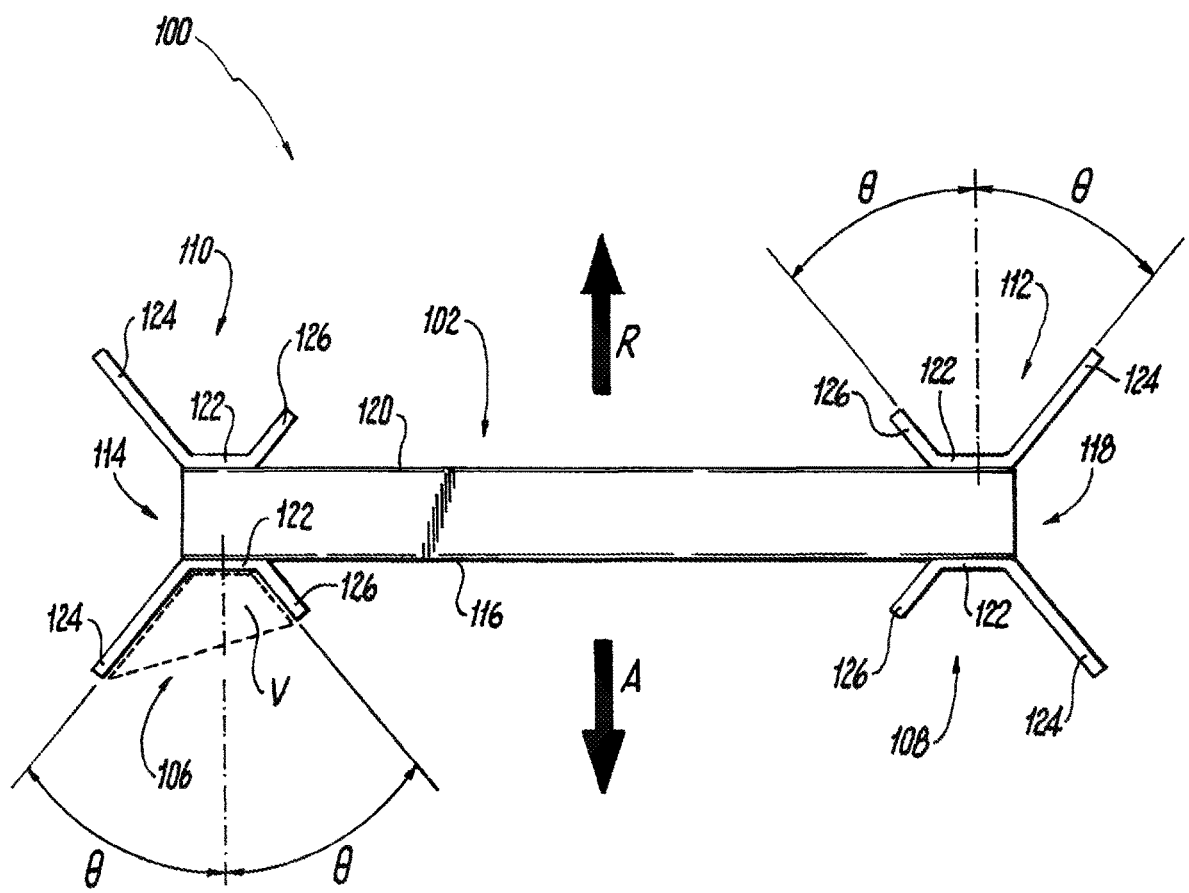
FIG. 4 is a schematic plan view of the recoater of FIG. 1, showing the four baffles.

Referring now to FIG. 4, the first baffle 106 is mounted to a first end 114 of a leading edge 116 of the recoater 102. The second baffle 108 is mounted to a second end 118 of the leading edge 116 opposite the first end 114. A third baffle 110 is mounted to a first end 114 of a trailing edge 120 of the recoater 102 opposite the leading edge 116. A fourth baffle 112 is mounted to a second end 118 of the trailing edge 120 of the recoater 102.

Each of the baffles 106, 108, 110, 112 includes a base 122 mounted to the recoater 102, a first wall 124 that extends obliquely ahead (or behind for baffles 110, 112) the base 122 and laterally outward from the base 122 relative to a respective advancing or returning direction A or R. Each of the baffles 106, 108, 110, 112 includes a second wall 126 opposite the first wall 124 that extends obliquely ahead of (or behind for baffles 110, 112) and laterally inward from the base 122 relative to the respective advancing or returning direction A, R. The first and second walls are each angled at an angle θ, such as 30°-60°, e.g., 45°, from the advancing or returning direction A, R of the recoater 102. The angle θ is labeled for one advancing baffle 110 and for one returning baffle 112 in FIG. 4, however, the baffles 108 and 110 follow the same respective geometry. The first wall 124 of each of the baffles 106, 108, 110, 112 is longer than the second wall 126. A volume V is defined between the first and second wall 124, 126 with capacity to collect powder as the recoater 102 advances or returns. The volume V is indicated schematically with a broken line for baffle 106 in FIG. 4, however the baffles 108, 110, 112 have the same respective volume V.

With reference again to FIG. 1, the build platform 104 is mounted stationary relative to advancing and returning movement of the recoater 102 over the build platform 104. A gas inlet 128 for introducing inert gas is included on a lateral side of the build platform 104. A gas outlet 130 for suctioning inert gas from the build platform 104 is included on a lateral side of the build platform 104 opposite the inlet 128. A powder drain 132 is included at one end of the build platform 104. A second powder drain 134 is included at an end of the build platform 104 opposite the first powder drain 132. The capacity in the volume V of each of the baffles 106, 108, 110, 112 is sufficient to collect and move powder in the advancing direction A (or for baffles 110, 112 in the returning direction R) to the respective powder drain 132, 134 with each advance or return of the recoater 102 to prevent buildup of lateral powder banks 136 which would otherwise grow to block flow of inert gas from the gas inlet 128 to the gas outlet 130. The powder drains 132, 134 are optional, and can be connected to a powder recycling system for reusing the powder deposited therein. In FIG. 1, the banks 136 and their effect on the flow arrows representing the inert gas are exaggerated for the sake of clarity.

A method of additive manufacturing includes advancing a recoater (e.g. recoater 102) over a build area (e.g. build area 138) to push powder across the build area. The method includes collecting powder in a baffle (e.g. baffles 106, 108, 110, 122) mounted to an end of the recoater, depositing the collected powder from the baffle beyond the build area (e.g in powder drains 132, 134), and selectively fusing powder in the build area, e.g., with a laser 140 as shown schematically in FIG. 3.

Figure 2:
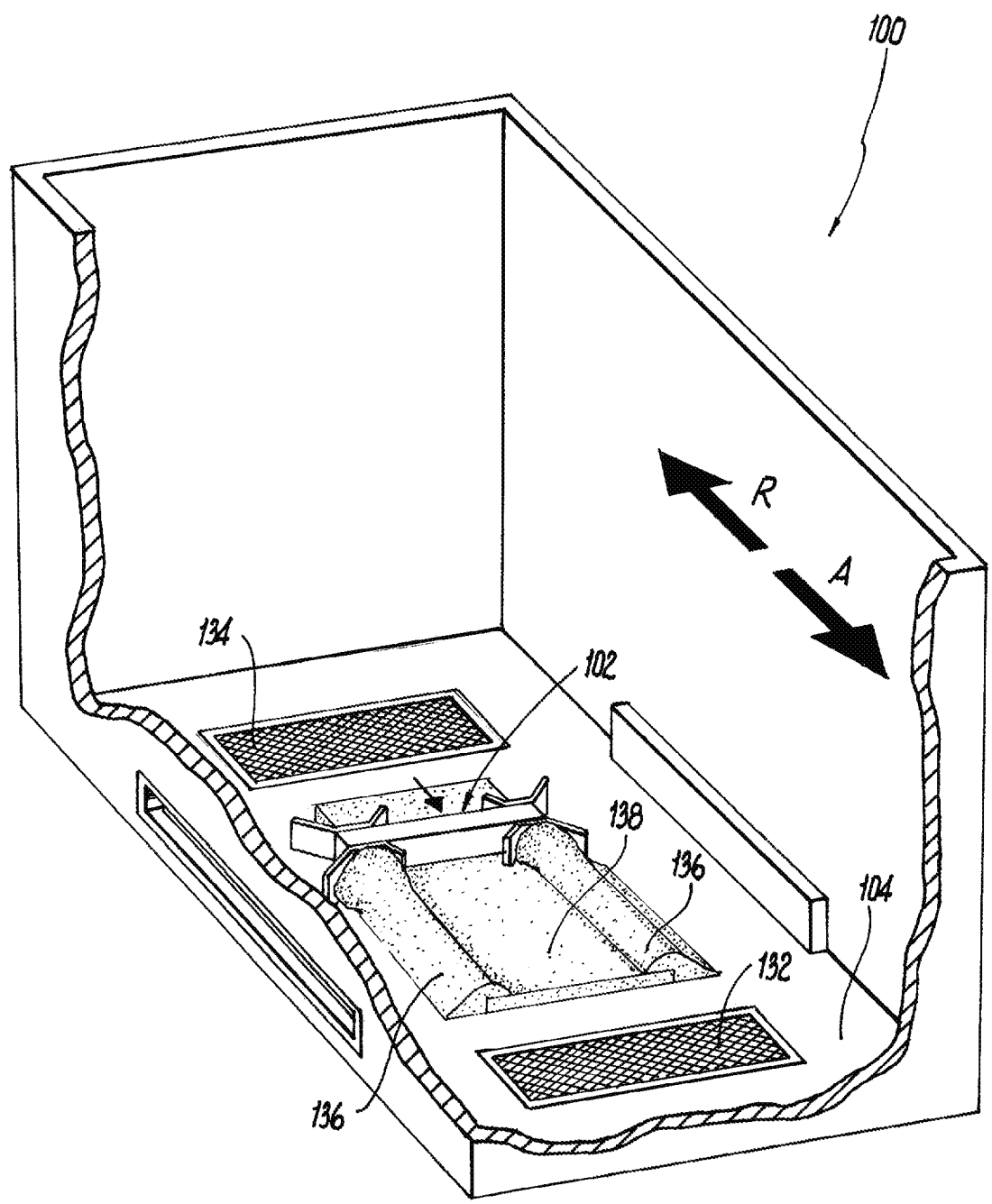
FIG. 2 is a schematic perspective view of the device of FIG. 1, showing the recoater advancing across the build area.
Figure 3:
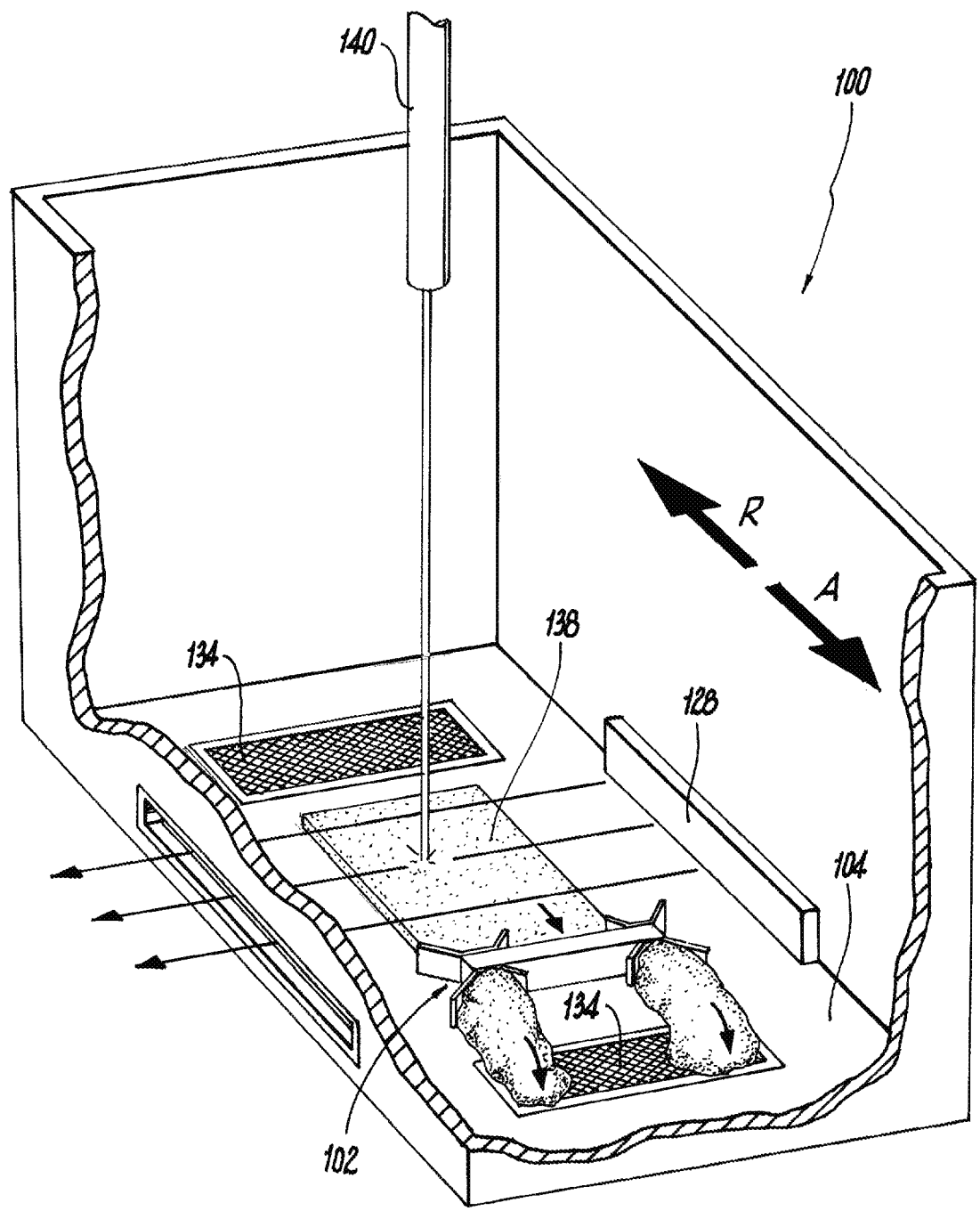
FIG. 3 is a schematic perspective view of the device of FIG. 1, showing the recoater depositing powder in a drain beyond the build area.

Collecting powder includes collecting powder in the first baffle 106 and in a second baffle 106, as the recoater advances across the build area 138 as shown in FIG. 2. As the powder collects in the baffles 106, 108, the volumes V (identified in FIG. 4) of the baffles 106, 108 gradually fill. However, the baffles 106, 108 are dimensioned so the volumes V can accommodate powder from a full recoater sweep of the build area 138 before overflowing and spilling out laterally. At the end of a full advancing sweep of the recoater 102, the powder from the volumes V of the baffles 106, 108 can be deposited in the powder drain 132, or optionally if no powder drain 132 is included, at least this powder is deposited away from the build area 138 to avoid disrupting the inert gas flow described above. The method can include returning the recoater 102 over the build area 138 in the return direction R to push powder across the build area 138, collecting powder in the third and fourth baffles 110, 112, and depositing the collected powder beyond the build area 138 (as in the position of the recoater 102 shown in FIG. 1), optionally into the powder drain 134 if included. The method can include bathing the build area 138 in a laminar flow of inert gas, as indicated schematically by the flow arrows in FIG. 3, while selectively fusing the powder in the build area 138, e.g., with the laser 140. The method can include repeating advancing the recoater 102, collecting powder, depositing the collected powder, selectively fusing powder, and bathing the build area 138 in a laminar flow of inert gas without building up a bank of powder along the build area 138, which would otherwise block the desirable uninterrupted, concentrated, laminar flow of inert gas over the build in progress in the build area 138.

Systems and methods as disclosed herein help ensure optical gas flow over a build stage during the melting process of additive manufacturing machines. This allows removal of condensates generated in the build process, keeps laser optics clean which is beneficial to the health of the additive manufacturing system, and enables consistent material properties throughout the parts being built.

The methods and systems of the present disclosure, as described above and shown in the drawings, provide for recoaters with superior properties including improved powder removal from in and around the build area to improve flow of inert gas during additive manufacturing. While the apparatus and methods of the subject disclosure have been shown and described with reference to illustrated exemplary embodiments, those skilled in the art will readily appreciate that changes and/or modifications may be made thereto without departing from the scope of the subject disclosure.

What is claimed is:

1. An additive manufacturing device comprising:
   a recoater configured to push powder onto a build platform, the recoater defining an advancing direction for pushing powder; and
   a first baffle mounted to a first end of a leading edge of the recoater and a second baffle mounted to a second end of the leading edge of the recoater opposite the first end, wherein each of the first and second baffles includes:
      a base mounted to the recoater;
      a first wall that extends obliquely ahead of and laterally outward from the base relative to the advancing direction; and
      a second wall opposite the first wall, the second wall extending obliquely ahead of and laterally inward from the base relative to the advancing direction, wherein a volume is defined between the first and second wall with capacity to collect powder as the recoater advances, wherein the second wall is opposite and laterally inward from the first wall.

2. The device as recited in claim 1, wherein the first and second walls are each angled 30-60° from the advancing direction of the recoater.

3. The device as recited in claim 1, wherein the first wall of each of the first and second baffles is longer than the second wall thereof.

4. The device as recited in claim 1, further comprising:
   a build platform mounted stationary relative to advancing and returning movement of the recoater over the build platform;
   a gas inlet for inert gas on a lateral side of the build platform; and
   a gas outlet for inert gas on a lateral side of the build platform opposite the inlet.

5. The device as recited in claim 4, further comprising:
   a powder drain at one end of the build platform, wherein the capacity of each of the first and second baffles is sufficient to collect and move powder in the advancing direction to the powder drain with each advance of the recoater to prevent buildup of lateral powder banks blocking flow of inert gas from the gas inlet to the gas outlet.

6. The device as recited in claim 1, further comprising:
   a third baffle mounted to a first end of a trailing edge of the recoater opposite the leading edge, and a fourth baffle mounted to a second end of the trailing edge of the recoater opposite the first end, wherein each of the third and fourth baffles includes:
      a base mounted to the recoater;
      a first wall that extends obliquely ahead of and laterally outward from the base relative to a returning direction opposite the advancing direction; and
      a second wall opposite the first wall extending obliquely ahead of and laterally inward from the base relative to the returning direction, wherein a volume is defined between the first and second wall with capacity to collect powder as the recoater returns from advancing.

7. The device as recited in claim 6, wherein the first and second walls of the third and fourth baffles can each be angled 30-60° from the returning direction of the recoater.

8. The device as recited in claim 6, wherein the first wall of each of the third and fourth baffles is longer than the second wall.

9. The device as recited in claim 6, further comprising:
   a build platform mounted stationary relative to advancing and returning movement of the recoater over the build platform;
   a gas inlet for inert gas on a lateral side of the build platform; and
   a gas outlet for inert gas on a lateral side of the build platform opposite the inlet.

10. The device as recited in claim 9, further comprising:
    a first powder drain at one end of the build platform, wherein the capacity of each of the first and second baffles is sufficient to collect and move powder in the advancing direction to the first powder drain with each advance of the recoater to prevent buildup of lateral powder banks blocking flow of inert gas from the gas inlet to the gas outlet; and
    a second powder drain at an end of the build platform opposite the first powder drain, wherein the capacity of each of the third and fourth baffles is sufficient to collect and move powder in the advancing direction to the second powder drain with each advance of the recoater to prevent buildup of lateral powder banks blocking flow of inert gas from the gas inlet to the gas outlet.

* * * * *